Figure 1:
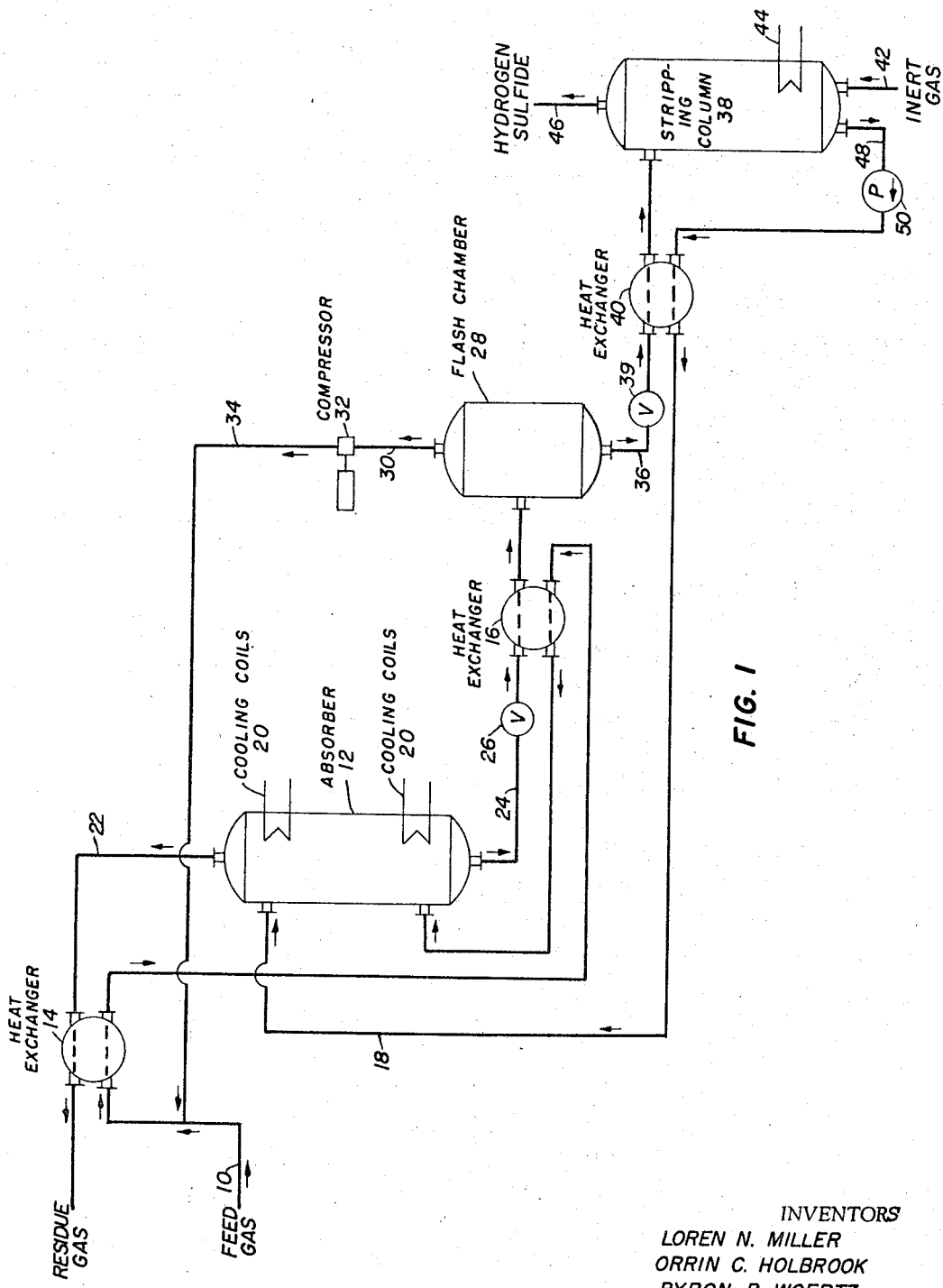

INVENTORS.
LOREN N. MILLER
ORRIN C. HOLBROOK
BYRON B. WOERTZ

ATTORNEY

3,375,639
EXTRACTION OF ACIDIC CONSTITUENTS FROM GAS MIXTURES WITH GAMMA-BUTYROLACTONE
Loren N. Miller, Crystal Lake, Ill., Orrin C. Holbrook, Andrews, Tex., and Byron B. Woertz, Crystal Lake, Ill., assignors, by mesne assignments, to Union Oil Company of California, Los Angeles, Calif., a corporation of California
Filed Dec. 27, 1962, Ser. No. 247,690
2 Claims. (Cl. 55—195)

This invention relates to a selective solvent for removing acid gases from admixtures with non-acidic constituents and, more particularly, to an improved apparatus for the removal of carbon dioxide and/or hydrogen sulfide from a gaseous mixture containing same and hydrocarbons and/or other non-acidic constituents by the use of a selective solvent consisting essentially of γ-butyrolactone

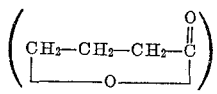

This invention is especially useful for removing acid gas from natural gases containing significant amounts of ethane and heavier hydrocarbons.

The acid gas content of natural gases varies between broad limits, depending on the field from which the natural gas was produced. Natural gases produced from some subterranean reservoirs contain undesirably high concentrations of acid gases, such as carbon dioxide and hydrogen sulfide. Before these natural gases can be sold, it is necessary that the high concentration of acid gases be removed or at least reduced to an acceptable concentration. Various means of removing acid gases from natural gas have been proposed.

Since carbon dioxide and hydrogen sulfide are chemically reactive while the hydrocarbon gases are relatively inert, one approach taken in attempting to solve the problem of removing acid gas from a mixture containing the same is the use of a solvent which reacts with the acid gas to remove it in chemically combined form. For example, hot potassium carbonate and mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially costly when the gases contain relatively high concentrations of acid gas.

It has also been proposed to remove acid gases from gaseous mixtures by the utilization of solvents which have selective solubilities for acid gases. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor.

Propylene carbonate extraction is the most economical present method of removing large concentrations of carbon dioxide from methane since its capacity for carbon dioxide is high and its selectivity for extracting carbon dioxide from methane is excellent. However, its selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use in only very "lean" gas, i.e., gas having a low content of ethane and higher-molecular-weight hydrocarbons, its usefulness is restricted to the removal of carbon dioxide from natural gases produced from only a small percentage of existing fields.

In accordance with this invention, we have found that a selective solvent consisting essentially of γ-butyrolactone is an effective solvent for removing carbon dioxide and hydrogen sulfide from gaseous mixtures containing hydrocarbons and/or other non-acidic constituents. γ-Butyrolactone is superior to propylene carbonate with respect to selectivity in removing carbon dioxide from gaseous mixtures containing significant amounts of ethane and heavier hydrocarbons. U.S. Patent No. 2,383,551 discloses that butyrolactone is an effective solvent for carbon dioxide, but there is no suggestion of the superiority of γ-butyrolactone over propylene carbonate for separating carbon dioxide from gaseous mixtures containing hydrocarbons of higher molecular weight than methane. γ-Butyrolactone, being water miscible, will also dehydrate the gas being treated if its water content is kept low, e.g., less than 5 vol. percent, depending on contacting conditions. The γ-butyrolactone-containing solvent may be utilized in combination with a second higher-boiling, hygroscopic solvent, such as glycol, to remove additional moisture from the gaseous mixture, as well as to recover the γ-butyrolactone which would otherwise be lost in the process.

Figure 2:
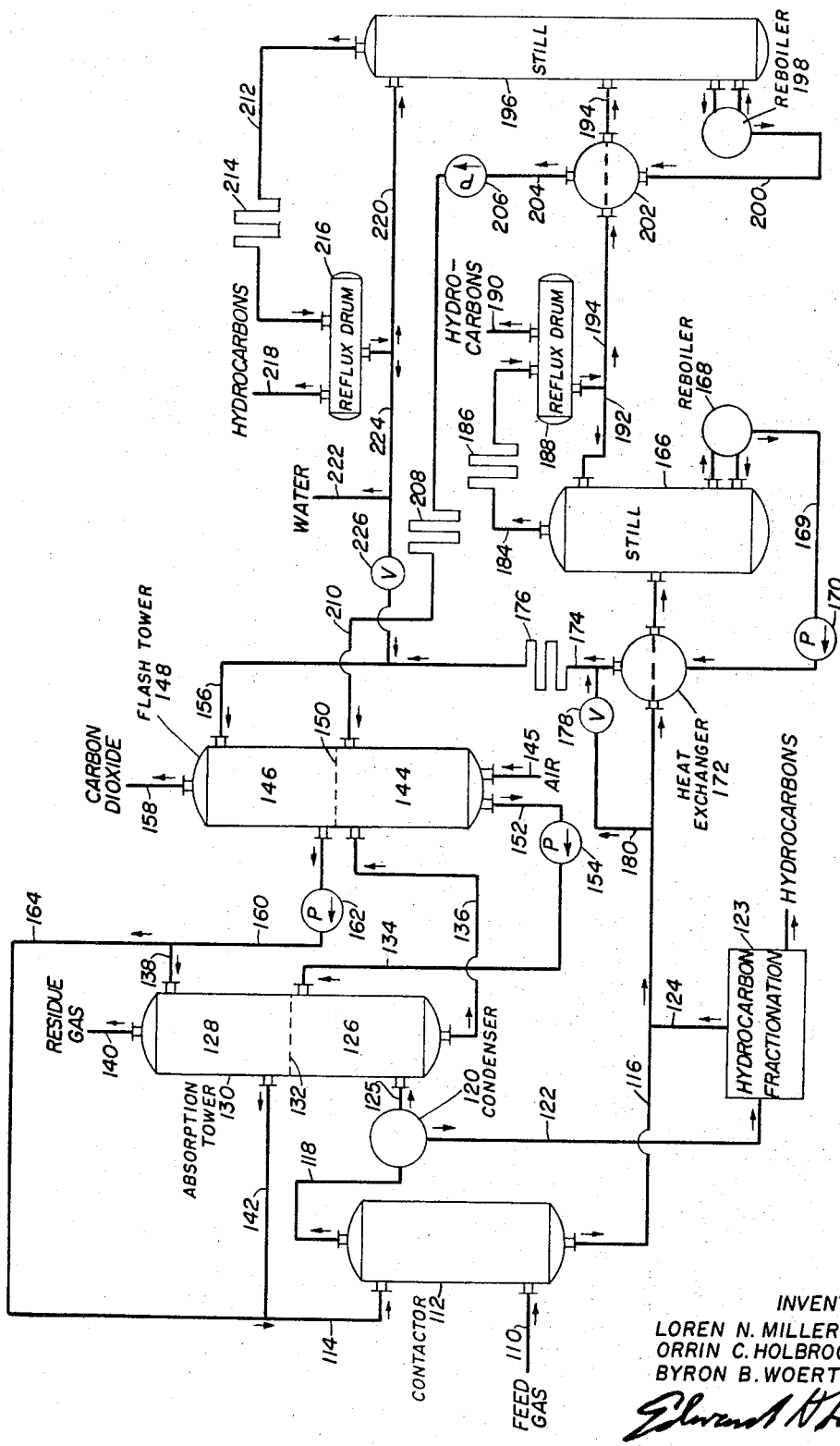

It is, therefore, a primary object of this invention to provide an apparatus for removing acid gases from gaseous mixtures containing same. Another object of this invention is to provide an apparatus for removing carbon dioxide and/or hydrogen sulfide from a hydrocarbon gaseous mixture containing same. Still another object of this invention is to provide an apparatus for removing carbon dioxide and/or hydrogen sulfide from natural gas containing significant amounts of ethane and higher-molecular-weight hydrocarbons. A further object of this invention is to provide apparatus for the removal of carbon dioxide and/or hydrogen sulfide from gaseous mixtures utilizing a superior selective solvent consisting essentially of γ-butyrolactone. A still further object of this invention is to provide an apparatus for removing carbon dioxide and/or hydrogen sulfide, as well as moisture, from gaseous mixtures utilizing a combination of a solvent consisting essentially of γ-butyrolactone and a second higher boiling, hygroscopic solvent, the second solvent also serving to recover γ-butyrolactone which would otherwise be lost in the apparatus. These and further objects of this invention will become apparent and be described as the description herein proceeds and reference is made to the accompanying drawings in which:

FIGURE 1 is a diagrammatic illustration of an absorption-desorption system of this invention; and FIGURE 2 is a diagrammatic illustration of an alternative embodiment of an absorption-desorption system of this invention utilizing a solvent in combination with a higher boiling, hygroscopic solvent.

In general, this invention contemplates the removal of carbon dioxide and/or hydrogen sulfide from gaseous mixtures containig same by treatment with a selective solvent consisting essentially of γ-butyrolactone. In addition to the treatment of natural gas containing carbon dioxide and/or hydrogen sulfide, the apparatus of this invention is applicable to the treatment of any gaseous mixture containing either or both of the acid gases as long as the solvent has a selectivity for extracting the acid gas from the gaseous mixture. For example, the solvent of this invention can be used for removing carbon dioxide from flue gas, hydrogen, or reformed gas for ammonia synthesis.

The suitability of γ-butyrolactone as a selective solvent for carbon dioxide has been demonstrated experimentally in a series of tests wherein the capacity of a number of solvents for carbon dioxide and propane, and the selectivity for carbon dioxide relative to ethane and propane, were determined. Solubilities were measured by injecting a measured volume of solvent into an evacuated Dumas bulb, measuring the vapor pressure of the solvent, and then metering in sufficient carbon dioxide to bring the bulb to atmospheric pressure. A series of calculations provided a corrected solubility of carbon dioxide at 80° F. The propane solubilities were similarly measured. The ratio of the carbon dioxide solubility to the propane solubility was termed the selectivity ratio. Since scattered tests using various solvents indicated that the ethane solubilities are direct functions of the propane solubilities, the ratio of carbon dioxide solubility to the propane solubility was used to calculate the ethane selectivity. The results of this comparison are shown in Table I.

TABLE I

|  | Solvent Capacity* | | Selectivity Ratio | |
|---|---|---|---|---|
|  | $CO_2$ | $C_3H_8$ | $CO_2/C_3H_8$ | $CO_2/C_2H_6$ |
| γ-Butyrolactone | 4.3 | 2.34 | 1.9 | 5.6 |
| Methyl Alcohol | 3.5 | 5.8 | 0.6 | 1.8 |
| Propylene Carbonate | 3.20 | 1.84 | 1.7 | 5.1 |
| Absorber Oil | 0.9 | 9.0 | 0.1 | 0.5 |

*The solubilities determined were the volumes of gas, measured at 80° F. and 760 mm. of mercury, which dissolved per volume of solvent when the partial pressure of the gas above the solvent was one atmosphere This comparison shows that while the capacity of γ-butyrolactone for propane is somewhat higher than that of propylene carbonate, its capacity for carbon dioxide is over one-third greater than the capacity of propylene carbonate for carbon dioxide. It can also be seen that the resulting selectivity of γ-butyrolactone for extracting carbon dioxide from ethane and propane is over 10% greater than that of propylene carbonate at atmospheric pressure. The superiority of γ-butyrolactone over other solvents will be apparent from the selectivity ratios given in the above table.

γ-Butyrolactone may be used in the pure form and in admixture with inert solvents to modify one of its properties, such as to reduce the partial pressure of its vapor, or to modify its selectivity or capacity for absorbing the acid gas. The inert solvent is defined as one which is unreactive toward the γ-butyrolactone and other solvent constituents, and the constituents of the gas. In general, the γ-butyrolactone-containing solvent mixture may contain up to about 50% by volume of the inert solvents. Examples of inert solvents with which γ-butyrolactone may be used in admixture include propylene carbonate, ethylene carbonate, nitromethane, formamide, dimethylformamide and hydracrylonitrile. Ethylene carbonate, which has a melting point of about 95° F., is herein considered a liquid since most mixtures of it with the other described solvents are normally liquid at ambient temperatures.

The apparatus of this invention uses conventional absorption procedures, wherein the gaseous mixture is contacted with a selective solvent in either batchwise or countercurrent treatment. Successive batchwise extractions also can be used. In the preferred method of the invention, the gaseous mixture to be treated is contacted in a countercurrent absorption tower with the γ-butyrolactone-containing solvent in a continuous flow method. The spent solvent is continuously withdrawn from the absorption tower and is introduced into a flash chamber and/or air-stripping column to remove the absorbed gases. The regenerated solvent is then recycled through the absorption tower where it is used again.

The extraction apparatus is preferably operated at temperatures within the range of about −45° to 100° F., although higher and lower temperatures may be utilized. It will be evident that the minimum temperature at which any specific solvent can be used is the minimum temperature at which the composition is a liquid, or the hydrate temperature of the gas, whichever is higher. Pressures from about 100 to 1500 p.s.i.g. (pounds per square inch gauge) may be used. The vaporization loss of the solvent is a factor to be considered in determining the contacting condition. For example, the vaporization loss of γ-butyrolactone in the residue gas will be limited to about 0.1 gal./MM c.f. residue gas if a maximum contact temperature of 42° F. is used in an absorption tower operating at 600 p.s.i.g. In general, the feed gas is contacted with the solvent at a rate of about 5 to 150 gallons of solvent per M c.f. of gas, measured at standard conditions of temperature and pressure, namely 14.7 p.s.i.a. and 60° F.

This invention is best understood by reference to FIGURE 1, wherein a feed gaseous mixture such as natural gas, containing hydrogen sulfide which is to be removed therefrom, is fed through line 10 into the bottom of absorber 12 after it passes in indirect heat exchange with the residue gas from absorber 12 in heat exchanger 14 and rich absorbent in heat exchanger 16. The γ-butyrolacetone absorbent or γ-butyrolactone-containing absorbent mixture, both of which are hereinafter referred to merely as the γ-butyrolactone absorbent, is introduced into the top of absorber 12 through line 18. Absorber 12 can be any suitable absorption column, such as a vertically extended column, containing appropriate packing or trays to assure intimate countercurrent contact of the rising feed mixture with the down-flowing absorbent, and cooling coils 20 to provide the desired degree of cooling, as illustrated in the drawing. Absorber 12 is maintained under such conditions of pressure, usually superatmospheric, and temperature that hydrogen sulfide is absorbed from the feed mixture. As previously indicated, the absorption is preferably carried out at a temperature within the range of about −45° to 100° F. and a feed gas inlet pressure between about 100 and 1500 p.s.i.g. In general, the amount and rate of acid gas absorption increase directly with an increase in the pressure maintained in the absorption zone. The feed mixture, from which at least part of the hydrogen sulfide content has been absorbed, is then removed from absorber 12 through line 22, passed in indirect heat exchange with the feed gas in exchanger 14, and fed to a suitable receiver or otherwise disposed of.

The spent γ-butyrolactone absorbent, containing absorbed hydrogen sulfide, is withdrawn from absorber 12 through line 24. Then, the rich absorbent undergoes a controlled pressure reduction, such as by being passed successively through expansion valve 26 and heat exchanger 16 into flash chamber 28. Flash chamber 28 is maintained at a pressure below the pressure of absorption column 12, but above atmospheric pressure, e.g., about 50 to 200 p.s.i.g. As the absorbent undergoes a pressure reduction, it is cooled due to the loss of heat or absorption acquired in absorber 12 and expansion of absorbed hydrogen sulfide to a lower partial pressure. Part of the absorbed hydrogen sulfide and non-acidic constituents of the feed gas are withdrawn from flash chamber 28 through line 30. The gases in line 30 are compressed in compresor 32, and passed through line 34 to be mixed with the feed gas before it passes through exchanger 14. The partially desorbed absorbent is withdrawn from flash chamber 28 through line 36 and fed into stripping column 38 after it has passed through expansion valve 39 and exchanger 40 in indirect heat exchange with the lean absorbent withdrawn from column 38.

Residue gas or an inert stripping gas is introduced into stripping column 38 through line 42. Stripping column 38 is provided with heating coil 44 to apply heat if necessary. In stripping column 38, substantially all of the remaining absorbed hydrogen sulfide is removed and withdrawn through line 46 to be disposed of as desired. Line 46 may be provided with a vacuum pump, if desired. The resulting lean absorbent is then withdrawn from stripping column 38 through line 48, where it is forced by pump 50 through exchanger 40 and then returned to absorber 12 through line 18. Line 18 may include a second heat exchanger, not shown, to further cool the lean absorbent after it has passed through exchanger 40.

Other alternative absorption-desorption procedures will be apparent to those skilled in the art. For example, if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestages of absorbed hydrogen sulfide before it is recycled to the absorption column. The residue gas from the absorber and/or the flash gas may be passed through a solid bed of an absorbent, such as silica gel, activated alumina, activated carbon or a synthetic zeolite, to separate vaporized absorbent therefrom.

In another alternative embodiment of this invention, the $\gamma$-butyrolactone absorbent may be used in combination with a second, higher-boiling, hygroscopic solvent which is absorptive of the $\gamma$-butyrolactone absorbent. The second absorbent serves to remove additional moisture from the feed gaseous mixture, as well as to recover $\gamma$-butyrolactone which would otherwise be lost in the product gas stream. The hygroscopic solvent may, for example, be any of the polyhydric alcohols or glycols which have been proposed or used for moisture extraction, such as ethylene glycol, propylene glycol, diethylene glycol, and triethylene glycol.

In accordance with this embodiment, the $\gamma$-butyrolactone absorbent may be used without uneconomically high solvent losses, which are common in conventional processes. The $\gamma$-butyrolacetone absorbent is used for the removal of carbon dioxide from the feed gas stream, and the hygroscopic solvent is used for the recovery of $\gamma$-butyrolactone absorbent from the effluent product gas and carbon dioxide streams, and for the removal of additional water from the feed gas stream.

This alternative embodiment is best understood by reference to FIGURE 2, wherein the numeral 110 represents the line through which the gas to be treated, for example, a natural gas consisting of hydrocarbons, carbon dioxide, and moisture, is fed into the bottom of contactor 112, in which it is countercurrently contacted with a mixture of the $\gamma$-butyrolacetone and hygroscopic solvent entering through line 114. Contactor 112, which may contain any suitable type and arrangement of trays or baffles as required for intimacy of contact between the absorbent mixture and feed gas, is preferably maintained at a temperature within the range of about 0° to 100° F. and pressure within the range of about 100 to 1500 p.s.i.g., although higher and lower temperatures and pressures may be used. A suitable example of the absorbent mixture entering contactor 112 through line 114 is 75 to 95% by weight of a glycol, such as diethylene or triethylene glycol, 0 to 20% by weight of $\gamma$-butyrolactone, and 0 to 20% by weight of water, the amount of the water being indirectly proportional to the contacting temperature in order to reduce the glycol viscosity. For low temperature operation, as at about −50° F. to 0° F., for example, a small amount of water is required in the glycol to maintain a satisfactory viscosity. The glycol containing a minor amount of water will still dehydrate the feed gas satisfactorily. In contactor 112, much of the water content of the feed gas stream is taken up by the glycol solvent. Glycol absorbent, containing water and some $\gamma$-butyrolactone absorbent, is withdrawn from contactor 112 through line 116. The resulting natural gas–$\gamma$-butyrolactone absorbent mixture leaves contactor 112 through line 118, and flows to chiller-condenser 120, in which its temperature is reduced to absorption temperature, for example, −50° to 80° F. The condensate is withdrawn from chiller-condenser 120 through line 122 and may be combined with the liquid in line 116. The condensate in line 122 is preferably first introduced into fractionating unit 123 to separate condensed hydrocarbons before it is combined with the liquid in line 116 by way of line 124.

The chilled, uncondensed components of the natural gas–$\gamma$-butyrolactone absorbent mixture pass from chiller-condenser 120 through line 125 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the down-flowing absorbent. In section 126, the gas is countercurrently contacted with $\gamma$-butyrolactone absorbent entering through line 134, which removes at least part of the acid gas constituents. Rich $\gamma$-butyrolactone absorbent, containing absorbed carbon dioxide, is withdrawn from absorption tower 130 through line 136. The scrubbed gas passes on upward past trap-out tray 132 into upper section 128, where it is countercurrently contacted with the glycol absorbent entering through line 138. The glycol absorbent scrubs any vaporized $\gamma$-butyrolactone absorbent from the natural gas, and the scrubbed natural gas product, of reduced carbon dioxide content, is withdrawn through line 140 to a suitable receiver or other disposition. The mixture of glycol and $\gamma$-butyrolactone absorbents from upper section 128 is trapped on tray 132, and is withdrawn through line 142 and introduced into contactor 112 through line 114.

The $\gamma$-butyrolactone absorbent in line 136 enters a combined flashing and contacting zone which, as illustrated, may be lower flashing zone 144 and upper contacting zone 146 in a single vertically extended vessel 148, with the upper and lower sections being separated by liquid trap-out tray 150. The rich $\gamma$-butyrolactone absorbent enters flash and stripping zone 144, which is maintained at a pressure below the absorption column pressure, and usually at about atmospheric pressure, where it undergoes pressure reduction to flash-off absorbed carbon dioxide. Zone 144 is provided with suitable contacting devices such as trays or packing. An inert stripping gas, such as air, may be introduced into zone 144 through line 145. The lean $\gamma$-butyrolactone absorbent is withdrawn from flash zone 144 through line 152 and is introduced back to absorption tower 130 by pump 154 through line 134. Carbon dioxide containing entrained or vaporized $\gamma$-butyrolactone absorbent leaves flash zone 144, and passes through trap-out tray 150 into contacting zone 146 where it is countercurrently contacted with glycol solvent entering through line 156. The glycol solvent scrubs any vaporized $\gamma$-butyrolactone absorbent from the carbon dioxide, and the carbon dioxide and stripping gas are withdrawn through line 158 to be disposed of as desired.

The resulting mixture of the glycol and $\gamma$-butyrolactone absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent containing water and some $\gamma$-butyrolactone absorbent, which was withdrawn from contactor 112 through line 116, is fed into glycol still 166, equipped with reboiler 168. Regenerated glycol, substantially free of $\gamma$-butyrolactone absorbent and water, is removed from reboiler 168 through line 169 and forced by pump 170 through heat exchanger 172, where it passes in indirect heat exchange with the mixture in line 116. From heat exchanger 172, the regenerated glycol passes through line 174, cooler 176 and line 156 to contacting zone 146 of vessel 148. If desired, part of the mixture in line 116 may be made to by-pass still 166 by opening valve 178 so that it passes through line 180 into line 174. Water and γ-butyrolactone absorbent are withdrawn as overhead from still 166 through line 184, and are passed through overhead condenser 186 and into reflux drum 188. Non-condensable hydrocarbon gases are vented from reflux drum 188 by line 190. From reflux drum 188, part of the liquid is returned through line 192 to still 166, while the balance is passed through line 194 to still 196.

Still 196 is provided with reboiler 198 from which regenerated γ-butyrolactone absorbent is withdrawn through line 200 and passed in heat exchange with liquid in line 194 in heat exchanger 202. The γ-butyrolactone is then withdrawn from heat exchanger 202 through line 204 and forced by pump 206 through cooler 208 and line 210 into flash zone 144 of vessel 148. The overhead from still 196, consisting mainly of water, is withdrawn through line 212 and passed through condenser 214 into reflux drum 216, from which hydrocarbons are withdrawn through line 218. Part of the water in reflux drum 216 is returned through line 220 to still 196, and the remaining portion is discarded through line 222 or fed through line 224 into line 156 by opening valve 226.

The following specific examples will serve more particularly to point out the instant invention.

Example I

A gaseous mixture containing 40% of carbon dioxide and 60% of methane was brought into equilibrium with γ-butyrolactone at 0° F. and 600 p.s.i.g. Analysis of the resulting liquid phase indicated it to be 47.1 mol percent of carbon dioxide, 2.4 mol percent of methane, and 50.5 mol percent of γ-butyrolactone. This indicated a solubility under these conditions of 39 s.c.f./gal. of carbon dioxide and 2 s.c.f./gal. of methane.

Tables II and III are illustrative of the process streams of the apparatus depicted in FIGURE 1 wherein a natural gas mixture is countercurrently contacted with the lean absorbent in absorber 12 containing ten theoretical trays. One hundred pound mols of the natural gas per unit time are contacted in different runs with γ-butyrolactone and propylene carbonate in such amounts that the residue gas (line 22) contains about 2 vol. percent of carbon dioxide. Absorber 12 is operated isothermally at 600 p.s.i.a. and 0° F. The rich absorbent withdrawn from absorber 12 is flashed at 150 p.s.i.a. and 0° F. in flash chamber 28 and the pressure of the partially desorbed absorbent withdrawn from flash chamber 28 is reduced to atmospheric pressure in stripping column 38. Table II gives the compositions of the process streams where the gas is contacted with γ-butyrolactone in absorber 12, and for the purpose of comparison, Table III gives the composition of the process streams where the gas is contacted with propylene carbonate.

The required solvent circulation is only 15.5 gallons of the γ-butyrolactone per M c.f. of inlet gas as compared to 26.2 gal./M c.f. when using propylene carbonate (gas and solvent volumes measured at 14.7 p.s.i.a. and 60° F.).

TABLE II.—$CO_2$ ABSORPTION PROCESS USING γ-BUTYROLACTONE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.00 | | 71.54 | 89.72 | 2.89 | 2.43 | 38.03 | 0.46 | 2.27 |
| Ethane | 6.00 | | 5.41 | 6.78 | 1.24 | 0.65 | 10.17 | 0.59 | 2.91 |
| Propane | 2.00 | | 1.16 | 1.45 | 1.18 | 0.34 | 5.32 | 0.84 | 4.15 |
| Carbon Dioxide | 19.00 | | 1.60 | 2.01 | 20.21 | 2.81 | 43.98 | 17.40 | 85.88 |
| n-Butane | 1.00 | | 0.03 | 0.04 | 1.13 | 0.16 | 2.50 | 0.97 | 4.79 |
| γ-Butyrolactone | 0 | 64.42 | 0 | 0 | 64.42 | 0 | 0 | 0 | 0 |
| Total | 100.00 | 64.42 | 79.74 | 100.00 | 91.07 | 6.39 | 100.00 | 20.26 | 100.00 |

TABLE III—$CO_2$ ABSORPTION PROCESS USING PROPYLENE CARBONATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | |
|---|---|---|---|---|---|---|---|---|---|
| | | | Mols | Mol Percent | | Mols | Mol Percent | Mols | Mol Percent |
| Methane | 72.0 | | 71.56 | 89.34 | 2.53 | 2.09 | 41.8 | 0.44 | 2.21 |
| Ethane | 6.0 | | 5.46 | 6.81 | 0.99 | 0.45 | 9.0 | 0.54 | 2.71 |
| Propane | 2.0 | | 1.33 | 1.66 | 0.87 | 0.20 | 4.0 | 0.67 | 3.37 |
| Carbon dioxide | 19.0 | | 1.60 | 2.00 | 19.56 | 2.16 | 43.2 | 17.40 | 87.44 |
| n-Butane | 1.0 | | 0.15 | 0.19 | 0.95 | 0.10 | 2.0 | 0.85 | 4.27 |
| Propylene Carbonate | 0 | 98.43 | 0 | 0 | 98.43 | 0 | 0 | 0 | 0 |
| Total | 100.0 | 98.43 | 80.10 | 100.00 | 123.33 | 5.00 | 100.0 | 19.90 | 100.00 |

Example III

Table IV is illustrative of the process streams wherein a natural gas mixture containing both carbon dioxide and hydrogen sulfide is contacted with γ-butyrolactone and then flashed and stripped under the conditions described in Example II, except the solvent circulation rate is 15.2 gallons of γ-butyrolactone per M c.f. of inlet gas. From Table IV it can be seen that γ-butyrolactone is effective for removing hydrogen sulfide as well as carbon dioxide from a gaseous mixture containing same.

TABLE IV.—$H_2S$ AND $CO_2$ ABSORPTION PROCESS USING γ=BUTYROLACTONE

| Components | Mols of Inlet Gas (Line 10) | Mols of Solvent (Line 18) Mols | Residue Gas (Line 22) | | Mols of Rich Solvent (Line 24) | Mols of 150 p.s.i.a. Flask Gas (Line 30) | Mols of Atmos. Strip Gas (Line 46) |
|---|---|---|---|---|---|---|---|
| | | | Mol percent | | | | |
| Methane | 72.00 | | 71.48 | 90.23 | 2.87 | 2.34 | 0.52 |
| Ethane | 6.00 | | 5.37 | 6.78 | 1.22 | 0.59 | 0.63 |
| Propane | 2.00 | | 1.14 | 1.45 | 1.15 | 0.30 | 0.86 |
| Carbon Dioxide | 14.00 | | 1.19 | 1.50 | 14.59 | 1.78 | 12.81 |
| Hydrogen Sulfide | 5.00 | | 0 | 0 | 5.24 | 0.24 | 5.00 |
| n-Butane | 1.00 | | 0.08 | 0.04 | 1.10 | 0.14 | 0.97 |
| γ-Butyrolaconte | 0 | 63.51 | 0 | 0 | 63.51 | 0 | 0 |
| Total | 100.00 | 63.51 | 79.21 | 100.00 | 89.68 | 5.39 | 20.79 D |

Example II

EXAMPLE IV

Tables V and VI are also illustrative of the process streams of the apparatus described in relation to FIGURE 1, where a natural gas containing carbon dioxide is contacted with the absorbent and then flashed and stripped under the conditions described in Example II, except absorber 12 is maintained at 600 p.s.i.a. and 40°

F. and the rich absorbent is flashed at 150 p.s.i.a. and 40° F. The required solvent circulation rate of the absorbent of Table V (75 vol. percent γ-butyrolactone and 25 vol. percent of ethylene carbonate) is 45.5 gal./M c.f. as compared to the solvent circuation rate of 44.5 gal./M c.f. for the solvent of Table VI (propylene carbonate), which is given for the purpose of comparison. By a review of Tables V and VI, it can be seen that γ-butyrolactone compares very favorably with propylene carbonate with respect to selectivity.

TABLE V.—$CO_2$ ABSORPTION PROCESS USING 75 VOL. PERCENT γ-BUTYROLACTONE AND 25 VOL. PERCENT ETHYLENE CARBONATE

| Components | Mols of Inlet Gas (Line 10) | Mols of Solvent (Line 18) | Residue Gas (Line 22) | | Mols of Rich Solvent (Line 24) | Mols of 150 p.s.i.a. Flask Gas (Line 30) | Mols of Atmos. Strip Gas (Line 46) |
|---|---|---|---|---|---|---|---|
| | | | Mols | Mol percent | | | |
| Methane | 72.00 | | 71.57 | 89.33 | 3.31 | 2.88 | 0.43 |
| Ethane | 6.00 | | 5.49 | 6.85 | 1.26 | 0.75 | 0.51 |
| Propane | 2.00 | | 1.31 | 1.63 | 1.07 | 0.38 | 0.69 |
| Carbon Dioxide | 19.00 | | 1.61 | 2.00 | 22.24 | 4.85 | 17.39 |
| n-Butane | 1.00 | | 0.15 | 0.19 | 1.05 | 0.20 | 0.85 |
| γ-Butyrolactone | 0 | 197.55 | 0 | 0 | 197.55 | 0 | 0 |
| Total | 100.00 | 197.55 | 80.13 | 100.00 | 226.48 | 9.06 | 19.87 |

TABLE VI.—$CO_2$ ABSORPTION PROCESS USING PROPYLENE CARBONATE

| Components | Mols of Inlet Gas (Line 10) | Mols of Solvent (Line 18) | Residue Gas (Line 22) | | Mols of Rich Solvent (Line 24) | Mols of 150 p.s.i.a. Flask Gas (Line 30) | Mols of Atmos. Strip Gas (Line 46) |
|---|---|---|---|---|---|---|---|
| | | | Mols | Mol percent | | | |
| Methane | 72.00 | | 71.57 | 89.41 | 3.68 | 3.25 | 0.43 |
| Ethane | 6.00 | | 5.47 | 6.83 | 1.29 | 0.76 | 0.53 |
| Propane | 2.00 | | 1.29 | 1.61 | 1.07 | 0.36 | 0.71 |
| Carbon Dioxide | 19.00 | | 1.60 | 2.00 | 22.54 | 5.15 | 17.39 |
| n-Butane | 1.00 | | 0.12 | 0.15 | 1.06 | 0.18 | 0.88 |
| Propylene Carbonate | 0 | 167.20 | 0 | 0 | 167.20 | 0 | 0 |
| Total | 100.00 | 167.20 | 80.05 | 100.00 | 196.84 | 9.70 | 19.94 |

The embodiments of the invention in which an exclusive property or privilege is claimed are defined as follows:

1. Apparatus for separating acidic gases from admixture with non-acidic gaseous constituents by contact with γ-butyrolactone comprising
   (a) a first gas-liquid contactor,
   (b) means for separately feeding absorbent liquid and gas into said contactor,
   (c) means for separately withdrawing absorbent liquid containing absorbed gas from said contactor,
   (d) a condenser means for condensing condensable constituents of said gas within the range of —50° to 80° F.,
   (e) conduit means for separately withdrawing gas from said contactor and discharging said gas into said condenser,
   (f) a second gas-liquid contactor,
   (g) conduit means for charging uncondensed gas from said condenser into said second contactor,
   (h) conduit means for charging absorbent liquid into said second contactor,
   (i) an absorber,
   (j) conduit means for charging gas from said second contactor into said absorber,
   (k) conduit means for charging absorbent liquid into said absorber,
   (l) conduit means for charging absorbent liquid containing absorbed gas from said absorber into said first contactor,
   (m) a flash zone,
   (n) conduit means for charging absorbent liquid containing absorbed gas from said second gas-liquid contactor into said flash zone,
   (o) conduit means for returning lean absorber liquid from said flash zone into said second gas-liquid contactor,
   (p) conduit means for charging gas from said flash zone into a liquid-gas contacting zone,
   (q) means for contacting gas in said liquid-gas contacting zone with absorbent liquid containing absorbed gases, withdrawn from said first gas-liquid contactor,
   (r) means for returing absorbent liquid containing absorbed gas from said liquid-gas contacting zone into first liquid-gas contactor and into said absorber,
   (s) means for separating gas from liquid absorbent withdrawn from said first gas-liquid contactor prior into charging said absorbent to said liquid-gas contacting zone,
   (t) conduit means for withdrawing gas from said liquid-gas contacting zone and from said absorber,
   (u) means for recovering absorbent liquid withdrawn from said first gas-liquid contactor, and
   (v) conduit means for recirculating said recovered absorbent liquid into said flash zone.

2. Apparatus in accordance with claim 1 including
   (w) conduit means for withdrawing vapors and gases from said means for recovering absorbent liquid, and
   (x) means for condensing at least a portion of said vapors and gases and returning resulting condensate into said liquid-gas contacting zone.

References Cited

UNITED STATES PATENTS

| | | | |
|---|---|---|---|
| 2,139,375 | 12/1938 | Millar et al. | 55—73 |
| 2,383,551 | 8/1945 | Isham | 62—17 |
| 2,781,863 | 2/1957 | Bloch et al. | 55—73 X |
| 2,863,527 | 12/1958 | Herbert et al. | |
| 2,926,751 | 3/1960 | Kohl et al. | 55—68 X |
| 3,097,917 | 7/1963 | Dotts et al. | 55—73 X |

FOREIGN PATENTS

| | | |
|---|---|---|
| 728,444 | 4/1955 | Great Britain. |
| 750,399 | 6/1965 | Great Britain. |
| 596,692 | 4/1960 | Canada. |
| 596,693 | 4/1960 | Canada. |

OTHER REFERENCES

Hill et al.: Organic Chemistry, The Blakiston Company, Philadelphia, Pa., 1945, pages 377 and 382.

REUBEN FRIEDMAN, *Primary Examiner.*

D. TALBERT, *Assistant Examiner.*